(12) United States Patent
Piwowarski

(10) Patent No.: US 10,570,062 B2
(45) Date of Patent: Feb. 25, 2020

(54) METHOD FOR PRODUCING A GYPSUM PLASTERBOARD

(71) Applicant: KNAUF GIPS KG, Iphofen (DE)

(72) Inventor: Jacek Piwowarski, Belchatów (PL)

(73) Assignee: Knauf Gips KG, Iphofen (DE)

( * ) Notice: Subject to any disclaimer, the term of this patent is extended or adjusted under 35 U.S.C. 154(b) by 283 days.

(21) Appl. No.: 15/027,525

(22) PCT Filed: Oct. 7, 2013

(86) PCT No.: PCT/EP2013/070852
§ 371 (c)(1),
(2) Date: Apr. 6, 2016

(87) PCT Pub. No.: WO2015/051822
PCT Pub. Date: Apr. 16, 2015

(65) Prior Publication Data
US 2016/0236978 A1     Aug. 18, 2016

(51) Int. Cl.
| | | |
|---|---|---|
| *C04B 9/04* | (2006.01) |
| *C04B 11/00* | (2006.01) |
| *C04B 28/14* | (2006.01) |
| *B28B 17/02* | (2006.01) |
| *C04B 24/00* | (2006.01) |
| *C04B 24/42* | (2006.01) |
| *C04B 7/00* | (2006.01) |
| *C04B 7/34* | (2006.01) |
| *C04B 28/00* | (2006.01) |
| *C04B 32/00* | (2006.01) |
| *C04B 111/00* | (2006.01) |

(52) U.S. Cl.
CPC .......... *C04B 11/005* (2013.01); *B28B 17/023* (2013.01); *C04B 24/00* (2013.01); *C04B 24/42* (2013.01); *C04B 28/14* (2013.01); *C04B 2111/0062* (2013.01); *Y02W 30/95* (2015.05)

(58) Field of Classification Search
USPC .................. 106/481, 781, 778, 772, 638
See application file for complete search history.

(56) References Cited

U.S. PATENT DOCUMENTS

| | | |
|---|---|---|
| 4,191,667 A | 3/1980 | Wehrmann et al. |
| 5,227,100 A | 7/1993 | Koslowski et al. |

(Continued)

FOREIGN PATENT DOCUMENTS

| | | |
|---|---|---|
| CN | 102557719 A | 7/2012 |
| CN | 202556554 U | 11/2012 |

(Continued)

OTHER PUBLICATIONS

Chinese Office Action, Chinese Patent Application No. 201380079573.1, dated May 9, 2017.

(Continued)

*Primary Examiner* — James E McDonough
(74) *Attorney, Agent, or Firm* — The Webb Law Firm

(57) ABSTRACT

A method for producing a gypsum plasterboard comprising the steps of providing bundler dust obtained from gypsum plasterboard leftovers of a plasterboard trimming process by a trimming device, in particular by a bundler saw; and adding at least a part of the bundler dust to a gypsum slurry for producing the gypsum plasterboard.

14 Claims, 2 Drawing Sheets

(56) References Cited

U.S. PATENT DOCUMENTS

| | | | |
|---|---|---|---|
| 5,304,276 A * | 4/1994 | MacLeod | B09B 3/00 |
| | | | 156/701 |
| 5,520,779 A | 5/1996 | Bold | |
| 5,632,848 A | 5/1997 | Richards et al. | |
| 2003/0150190 A1 | 8/2003 | Schroth | |
| 2004/0201120 A1 * | 10/2004 | Colbert | B01F 3/04446 |
| | | | 264/45.8 |
| 2006/0278128 A1 | 12/2006 | Liu et al. | |
| 2007/0251628 A1 * | 11/2007 | Yu | B32B 13/04 |
| | | | 156/39 |
| 2009/0074977 A1 | 3/2009 | Martin et al. | |
| 2009/0152519 A1 * | 6/2009 | Francis | C04B 28/14 |
| | | | 252/601 |
| 2012/0168054 A1 * | 7/2012 | Chen | C03C 25/26 |
| | | | 156/62.2 |
| 2014/0315008 A1 * | 10/2014 | Francis | B28B 19/0092 |
| | | | 428/220 |

FOREIGN PATENT DOCUMENTS

| | | |
|---|---|---|
| DE | 2740018 A1 | 3/1979 |
| DE | 4127932 A1 | 2/1993 |
| EP | 0464044 A1 | 1/1992 |
| EP | 0490160 A1 | 6/1992 |
| EP | 0599925 A1 | 6/1994 |
| EP | 1112986 A1 | 7/2001 |
| JP | 05238850 A | 9/1993 |
| JP | 09165244 A | 6/1997 |
| JP | 10330174 A | 12/1998 |
| JP | 2004508259 A | 3/2004 |
| JP | 2004517018 A | 6/2004 |
| JP | 2008509824 A | 4/2008 |
| JP | 2008543705 A | 12/2008 |
| JP | 2008546620 A | 12/2008 |
| WO | 9011259 A1 | 10/1990 |

OTHER PUBLICATIONS

Chinese Office Action, Chinese Patent Application No. 201380079573.1, dated Jan. 31, 2018.

Georgia Office Action, Georgia Patent Application No. 2013014135, dated Feb. 21, 2018.

Japanese Office Action, Japanese Patent Application No. 2016-520610, dated Aug. 18, 2017.

Japanese Office Action, Japanese Patent Application No. 2016-520610, dated Mar. 28, 2018.

Japanese Office Action, Japanese Patent Application No. 2016-520610, dated Nov. 2, 2018.

Inorganic Materials Society, "Cement gypsum lime handbook" with English-language abstract, Gihodo Publishing, 1995, pp. 750, Japan.

* cited by examiner

METHOD FOR PRODUCING A GYPSUM PLASTERBOARD

CROSS-REFERENCE TO RELATED APPLICATIONS

This application is the United States national phase of International Application No. PCT/EP2013/070852 filed Oct. 7, 2013, which is hereby incorporated in its entirety by reference.

BACKGROUND OF THE INVENTION

Field of the Invention

The present invention relates to a method for producing a gypsum plasterboard, a method of preparing bundler dust for producing a gypsum plasterboard, a use of bundler dust as additive for producing a gypsum plasterboard, and related products and apparatus.

Description of Related Art

Methods for producing gypsum plasterboards are well known. A gypsum slurry is usually prepared and dried on a support and/or transporting device in order to provide a dry gypsum layer. The gypsum layer is trimmed in order to finalise single gypsum plasterboards. The step of trimming the plasterboards usually comprises the use of a trimming device, in particular a bundler saw. Such plasterboards are comparatively light and have further advantages. It is known for example to use foaming agents for producing pores in order to reduce the weight of the plasterboard. Such additives, however, are expensive. In general, additives are used to produce plasterboards with different properties, in particular weight. The consumption of a foaming agent as additive in order to produce a comparatively low weight plasterboard, is very high. The high consumption of foaming agent results in comparatively high production process costs. Conclusively, it is in principle possible to produce comparatively light weighted plasterboards by using a very high amount of foaming agent.

It is an object of the present invention to propose a method of manufacturing a gypsum plasterboard and a corresponding apparatus, wherein costs and weight are comparatively low.

SUMMARY OF THE INVENTION

This object is achieved according to the invention, by a method for producing a gypsum plasterboard which comprises the steps of:
  providing bundler dust obtained from gypsum plasterboard leftovers of a gypsum plasterboard trimming using a trimming device, in particular a bundler saw
  adding at least a part of the bundler dust to a gypsum slurry for producing the gypsum plasterboard.

A central aspect of the invention lies in the use of (green) bundler dust as an additive for the production process in a small, controlled quantity. In general, the leftovers or scraps of trimmed plasterboards are waste which must be disposed. According to the invention, however, this "waste" is used in order to improve the properties of the gypsum plasterboard. In particular, it is possible by use of (green) bundler dust to achieve an advantageous porosity of (at least parts of) the plasterboard, for example in the gypsum core.

Preferably, the amount of bundler dust is (precisely) controlled (e.g. open-loop) and/or regulated (closed-loop control). Thereby, the amount of (green) bundle dust can be optimized in order to achieve a light and stable (hard or rigid, respectively) plasterboard.

Preferably, the step of providing the bundler dust comprises a milling of the leftovers, preferably in a pin mill. The board leftovers (or scraps) can be collected by a de-dusting system. The milling process can provide a (fine) powder in particular by use of a pin mill. The milled leftovers can be added (in a controlled manner) to the production process so that a light gypsum plasterboard can be provided.

The bundler dust is preferably obtained from the production process of (impregnated) plasterboards, wherein a hydrophobic agent is preferably silicone oil (polymethylhydrogen siloxane). Such bundler dust permits the production of light plasterboards with advantageous porosity.

In a preferred embodiment, a (stable) foaming agent is added to the gypsum slurry. In this case, the bundler dust serves as catalyst for the creation of large air pores. Hence, the amount of foaming agent may be comparatively low (or not highly increased) in order to produce a comparatively light weighted plasterboard.

The addition of (green) bundler dust results in a pore agglomeration effect so that a light and stable gypsum plasterboard can be produced. The paper bonding (if paper is used within the production process) is comparable to boards with a higher weight, or even improved.

A plurality of gypsum plasterboards may be continuously produced, wherein (only a part of) the leftovers of a previously produced gypsum plasterboard are returned to the production process. This means, only certain amount of the bundler dust or the leftovers may be reintroduced into the production process. Thereby, it is possible to control the properties of the gypsum plasterboard and in particular the catalisation effect of the (green) bundler dust.

Preferably, the amount of bundler dust added to the gypsum slurry is X, wherein $0.1 \text{ g/m}^2 \leq X \leq 30 \text{ g/m}^2$, preferably $0.2 \text{ g/m}^2 \leq X \leq 10 \text{ g/m}^2$, further preferably $0.5 \text{ g/m}^2 \leq x \leq 4 \text{ g/m}^2$, in particular $0.6 \text{ g/m}^2 \leq X \leq 2 \text{ g/m}^2$ (for A13) or $2.4 \text{ g/m}^2 \leq X \leq 3 \text{ g/m}^2$ (for H2 13). X may vary between the ranges above or be constant (preferably having a value within said ranges). If the amount of (green) bundler dust is changed during the production process, it may depend on the plasterboard type and the behaviour on the production line, as well as a required porosation of the gypsum plasterboard (gypsum core). In any case, a light and stable gypsum plasterboard can be provided (with a good paper bonding). The term "A 13" means a gypsum plaster board according to European standard EN 520 type A, thickness=12.5 mm. The term "H2 13" means a gypsum plaster board according to European standard EN 520 type H2, thickness=12.5 mm.

A (naftalen) sulfonate-based liquefier may be added to the gypsum slurry, preferably in an amount of 2 to 15 $g/m^2$, further preferably in an amount of 4 to 8 $g/m^2$. Such addition further improves the porosation effect of the (green) bundler dust so that a light plasterboard can be produced. In particular, the (naftalen) sulfonate-based liquefier strongly supports the catalisation effect of the (green) bundler dust for the creation of large air pores (if a foaming agent is added). It is advantageous to add a liquefier (a naftalen sulfonate-based liquefier) in an amount of 2 to 15 $g/m^2$, preferably 4 to 8 $g/m^2$.

According to a further aspect of the present invention, a method of preparing (green) bundler dust for producing gypsum plasterboards (particularly according to the production method as described above), comprises the steps of:

mixing a mixture of stucco, water and silicone oil
forming a cake of the mixture
drying and grinding the cake in order to prepare the (green) bundler dust.

Thereby, a light and stable plasterboard can be produced (with improved paper bonding).

According to a further aspect of the present invention, bundler dust may be used as additive for producing a gypsum plasterboard, wherein the amount X of bundler dust in a gypsum slurry is preferably $0.1 \text{ g/m}^2 \leq X \leq 30 \text{ g/m}^2$, further preferably $0.2 \text{ g/m}^2 \leq X \leq 10 \text{ g/m}^2$, further preferably $0.5 \text{ g/m}^2 \leq X \leq 4 \text{ g/m}^2$, in particular $0.6 \text{ g/m}^2 \leq X \leq 2 \text{ g/m}^2$ for A13 or $2.4 \text{ g/m}^2 \leq X \leq 3 \text{ g/m}^2$ for H2 13.

According to another aspect of the present invention, an apparatus for producing a gypsum plasterboard (in particular for the method and/or use as described above) comprises
  a device for providing bundler dust obtained from gypsum plasterboards leftovers of a plasterboard trimming using a trimming device, in particular a bundler saw,
  means for adding at least a part of the bundler dust to a gypsum slurry for producing the gypsum plasterboard,
  a control and/or regulation means in order to control and/or regulate the amount of bundler dust within the gypsum slurry.

Preferably, the trimming device, in particular bundler saw, is part of the apparatus. The control means may be an open-loop control means. The regulation means may be a closed-loop control means. The apparatus may comprise a mill, in particular pin mill, in order to mill the leftovers. Moreover, the apparatus may comprise means for adding a foaming agent and/or a liquefier to the gypsum slurry. In any case, in particular due to the control and/or regulation means, it is possible to produce a light and stable gypsum plasterboard. The costs are reduced.

According to another aspect of the present invention, a plasterboard may be produced by the above described method and/or under use of bundler dust, e.g. produced via the above described method and/or by using the above described apparatus.

It is preferred to use the method and/or apparatus of the present invention for paper plasterboards and/or for fibre plasterboards.

The term "$\text{g/m}^2$" may preferably mean the consumption quantity of any substance per square metre of a produced gypsum board (even if the thickness of the board varies).

BRIEF DESCRIPTION OF THE DRAWINGS

The invention will now be described in detail by way of example with reference to the enclosed drawings.

DETAILED DESCRIPTION OF THE PREFERRED EMBODIMENTS

Figure 1:
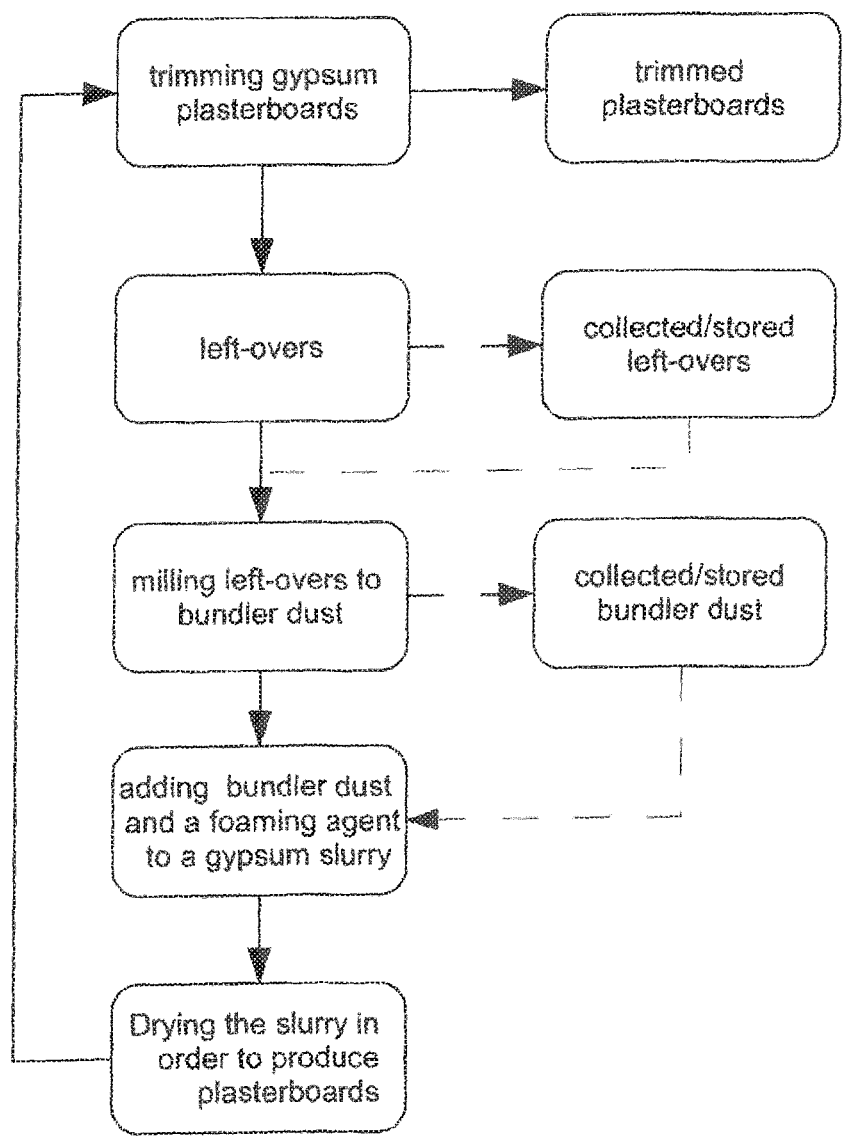
FIG. 1 shows a schematic illustration of the method steps for producing a gypsum plasterboard according to the invention.

The last step in producing gypsum plasterboards is the trimming of the gypsum plasterboard. Said trimming shall be also regarded as starting point of the procedure. At a certain point of time, gypsum plasterboards (in this embodiment, impregnated plasterboards where the hydrophobic agent is silicone oil, polymethylhydrogen-siloxane) are trimmed. The trimmed plasterboards may be prepared for transportation to the customer. The leftovers of the trimming process, however, are collected by a de-dusting system and milled to a fine powder in a pin mill. A part of the leftovers may be collected and stored so that only a part of the leftovers are milled in the pin mill. This means, neither is the material fully returned into the production process nor completely thrown away.

The resulting bundler dust may also be collected or stored and (a part of) the bundler dust (coming directly from the pin mill and/or the collected/stored bundler dust) is added to a gypsum slurry. The amount of bundler dust in this example may vary between $0.1 \text{ g/m}^2$ to $30 \text{ g/m}^2$, preferably $0.2 \text{ g/m}^2$ to $10 \text{ g/m}^2$, further $0.6$ to $2 \text{ g/m}^2$ (for A13) and $2.4$ to $3.0 \text{ g/m}^2$ for (H2 13). In any case, the (green) bundler dust is added in a small, controlled quantity.

It will be understood that a suitable controlling device should be used for controlling the amount of (green) bundler dust which is added to the production process (the gypsum slurry, respectively).

Moreover, a foaming agent is added to the gypsum slurry. Therefore, the (green) bundler dust is used as catalyst for the creation of large air pores. Without the (green) bundler dust, the same amount of foaming agent would result in a higher number of finer pores. Preferably, a controlled correlation between the amount of (green) bundler dust and the amount of foaming agent is (approximately) linear. Therefore, if the addition of (green) bundler dust is increased, the consumption of the foaming agent is higher. The exact amount of (green) bundler dust and a corresponding amount of foaming agent depends on the requirements for weight and stability of the plasterboards.

The (green) bundler dust allows a pore agglomeration similar to the pore agglomeration observed for well known unstable foams.

In essence, the amount of (green) bundler dust added to the production process influences the plasterboard core porosity. The correlation is (approximately) linear; a bigger amount of (green) bundler dust results in a higher gypsum (core) porosity. Precisely, the correlation between the amount of (green) bundler dust and core porosity depends on the production conditions. For the same product, however, this correlation is (more or less) linear.

The above described solution with an addition of (green) bundler dust as foaming catalyst has been tested. The result was a substantial board weight reduction without lower paper bonding (on the contrary, the paper bonding was even improved). The present invention therefore allows the production of low-weight plasterboards.

In the present embodiment, the bundler dust is prepared from leftovers of the trimming process. Alternatively, it is possible to obtain (green) bundler dust material (or bundler dust light material) in a separate line. For example, stucco, water and silicone oil can be mixed together to create a cake. This cake can be dried and ground in a grinder. Then, the ground material can be added to a stucco stream in a plasterboard production process. Tests have shown that similar effects for porosation can be expected. Since the (green) bundler dust from the trimming process is available in sufficient amounts, however, it is preferred to use this (green) bundler dust.

Figure 2:
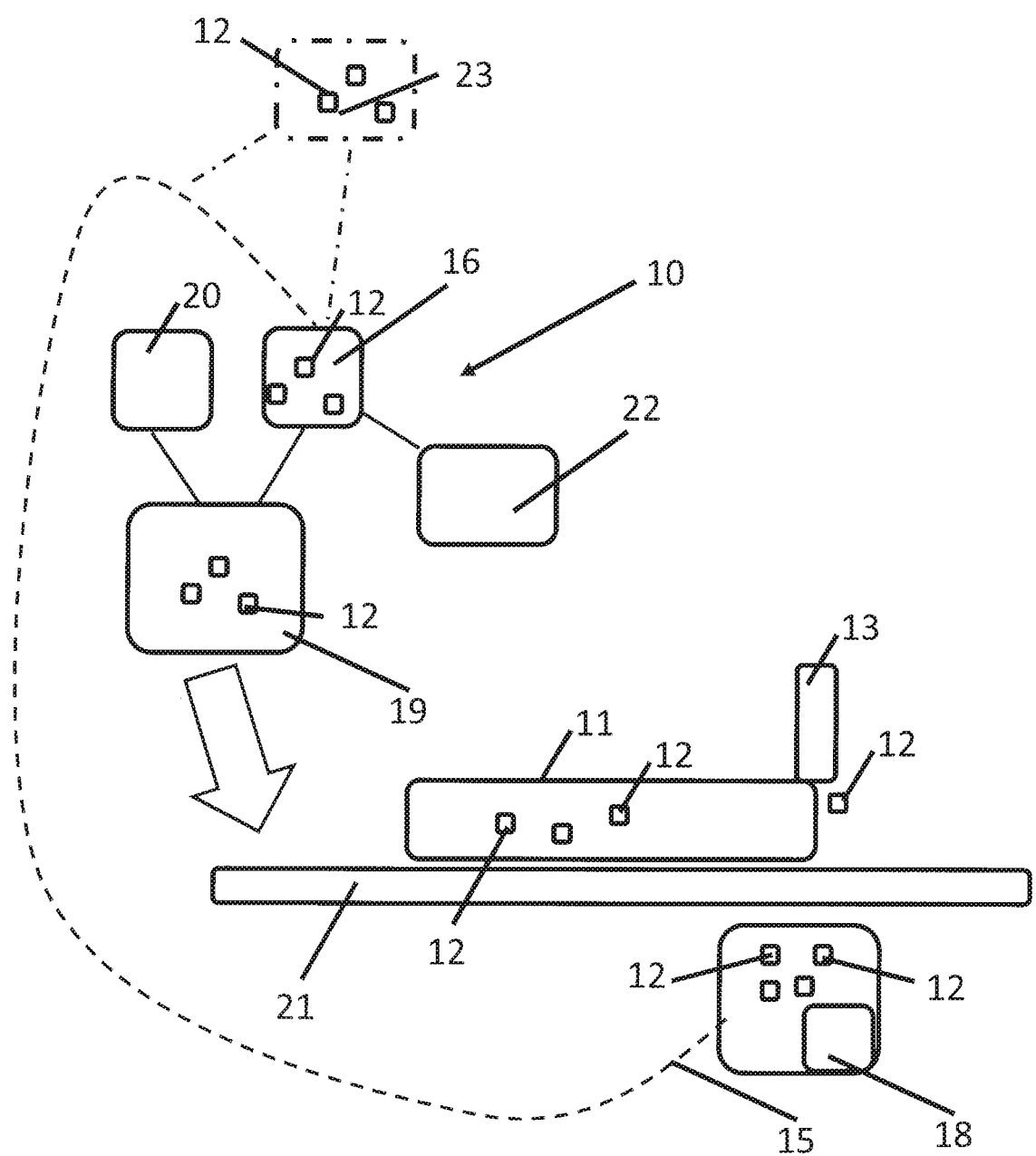
FIG. 2 shows a schematic illustration of an apparatus for producing a gypsum plasterboard according to the invention.

FIG. 2 shows an apparatus 10 for producing a gypsum plaster board 11 containing bundler dust particles 12 in a highly schematic illustration. The apparatus 10 comprises a trimming device (bundler saw) 13 which finalizes the paster board 11. Furthermore, a device 15 for providing the bundler dust particles 12 collects the bundler dust particles 12 being leftovers of the trimming process of the trimming device 13 and transports the bundler dust particles 12 to a slurry container 16. In the slurry container 16, the bundler dust particles 12 are mixed with gypsum slurry. The device 15 for providing the bundler dust contains a mill (pin mill) 18 for milling the leftovers of the trimming process. The gypsum slurry together with the bundler dust particles 12 in the container 16 is delivered to a further container 19 where it is mixed with a foaming agent and/or a liquefier coming from a corresponding container 20. The container 20 provides the gypsum slurry containing the bundler dust particles to a manufacturing line 21 so that the manufactured gypsum plaster board 11 contains the bundler dust particles 12. The amount of bundler dust within the gypsum slurry can be controlled by a regulation means 22.

Optionally, the bundler dust 12 can be stored in a storage container 23. From this storage container 23, the bundler dust 12 can be delivered to the container 16. In other words, the storage container 23 may function as intermediate container for intermediate storing of the bundler dust (before delivering to the slurry).

The invention claimed is:

1. A method for producing a gypsum plasterboard consisting of the steps of:
    preparing a gypsum slurry and drying it (on a support and/or transporting device) in order to provide a dry gypsum layer;
    providing the dry gypsum layer;
    trimming the gypsum layer in order to finalize single gypsum plasterboards;
    providing bundler dust obtained from gypsum plasterboard leftovers of a plasterboard trimming process using a trimming device; and
    adding at least a part of the bundler dust to the gypsum slurry for producing the gypsum plasterboard,
    wherein the bundler dust is obtained from the production process of impregnated plasterboards using a hydrophobic agent, wherein the hydrophobic agent is silicone oil.

2. The method of claim 1, wherein the amount of bundler dust is controlled and/or regulated.

3. The method of claim 1, wherein the step of providing the bundler dust comprises a milling of the leftovers preferably in a pin mill.

4. The method of claim 1, wherein the bundler dust is obtained from the production process of impregnated plasterboards, wherein the hydrophobic agent is polymethylhydrogen siloxane.

5. The method of claim 1, wherein a foaming agent is added to the gypsum slurry.

6. The method of claim 1, wherein several gypsum plasterboards are continuously produced wherein (only a part of) the leftovers of a preceding plasterboard is returned to the production process.

7. The method of claim 1, wherein the amount of bundler dust added to the gypsum slurry is X, wherein $0.1 \text{ g/m}^2 \leq x \leq 30 \text{ g/m}^2$.

8. The method of claim 1, wherein a (naftalen) sulfonate-based liquefier is added to the gypsum slurry in an amount of 2 to 15 g/m².

9. A method for producing a gypsum plasterboard consisting of the steps of:
    preparing a gypsum slurry and drying it (on a support and/or transporting device) in order to provide a dry gypsum layer;
    providing the dry gypsum layer;
    trimming the gypsum layer in order to finalize single gypsum plasterboards;
    providing bundler dust obtained from gypsum plasterboard leftovers of a plasterboard trimming process using a trimming device; and
    adding at least a part of the bundler dust to the gypsum slurry for producing the gypsum plasterboard,
    wherein the bundler dust is obtained from the production process of impregnated plasterboards using a hydrophobic agent, wherein the hydrophobic agent is silicone oil; and
    providing bundler dust obtained from a method of preparing bundler dust for producing gypsum plasterboards in accordance with claim 1, comprising the steps:
    mixing a mixture of stucco, water and silicone oil,
    forming a cake of the mixture,
    drying and grinding the cake in order to prepare the bundler dust; and
    adding at least a part of that bundler dust to the gypsum slurry for producing the gypsum plasterboard.

10. The method of claim 7, wherein the amount of bundler dust added to the gypsum slurry is X, wherein $0.2 \text{ g/m}^2 \leq X \leq 10 \text{ g/m}^2$.

11. The method of claim 10, wherein the amount of bundler dust added to the gypsum slurry is X, wherein $0.5 \text{ g/m}^2 \leq x \leq 4 \text{ g/m}^2$.

12. The method of claim 11, wherein the amount of bundler dust added to the gypsum slurry is X, wherein $0.6 \text{ g/m}^2 \leq X \leq 2 \text{ g/m}^2$.

13. The method of claim 11, wherein the amount of bundler dust added to the gypsum slurry is X, wherein $2.4 \text{ g/m}^2 \leq X \leq 3 \text{ g/m}^2$.

14. The method of claim 8, wherein a (naftalen) sulfonate-based liquefier is added to the gypsum slurry in an amount of 4 to 8 g/m².

* * * * *